US011853689B1

(12) United States Patent
Guliak et al.

(10) Patent No.: US 11,853,689 B1
(45) Date of Patent: *Dec. 26, 2023

(54) COMPUTER-IMPLEMENTED PRESENTATION OF SYNONYMS BASED ON SYNTACTIC DEPENDENCY

(71) Applicant: Grammarly, Inc., San Francisco, CA (US)

(72) Inventors: Roman Guliak, San Francisco, CA (US); Stanislav Levental, San Francisco, CA (US); Yuriy Tanskiy, San Francisco, CA (US)

(73) Assignee: Grammarly, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,164

(22) Filed: Dec. 19, 2022

Related U.S. Application Data

(63) Continuation of application No. 17/160,193, filed on Jan. 27, 2021, now Pat. No. 11,544,448, which is a continuation of application No. 16/945,453, filed on Jul. 31, 2020, now Pat. No. 10,915,697.

(51) Int. Cl.
| | |
|---|---|
| *G06F 40/247* | (2020.01) |
| *G06F 40/166* | (2020.01) |
| *G06F 40/30* | (2020.01) |
| *G06F 40/211* | (2020.01) |
| *G06N 3/08* | (2023.01) |
| *G06F 40/284* | (2020.01) |
| *G06F 3/04886* | (2022.01) |

(Continued)

(52) U.S. Cl.
CPC .......... *G06F 40/166* (2020.01); *G06F 3/0481* (2013.01); *G06F 3/04886* (2013.01); *G06F 40/211* (2020.01); *G06F 40/247* (2020.01); *G06F 40/284* (2020.01); *G06F 40/30* (2020.01); *G06N 3/045* (2023.01); *G06N 3/08* (2013.01)

(58) Field of Classification Search
CPC .. G06F 40/166; G06F 3/0481; G06F 3/04886; G06F 40/211; G06F 40/247; G06F 40/284; G06F 40/30; G06N 3/045; G06N 3/08
See application file for complete search history.

(56) References Cited

U.S. PATENT DOCUMENTS

| | | | |
|---|---|---|---|
| 8,463,591 B1 | 6/2013 | Chang | |
| 10,095,784 B2 * | 10/2018 | Gupta | ................... G06F 16/374 |
| 10,936,635 B2 * | 3/2021 | Kumbhar | ............... G06F 40/263 |

(Continued)

OTHER PUBLICATIONS

International Searching Authority, International Search Report and Written Opinion of the International Searching Authority for PCT/US2021/044006 dated Sep. 28, 2021. 11 pages.

(Continued)

*Primary Examiner* — Hien L Duong
(74) *Attorney, Agent, or Firm* — Baker Botts L.L.P.

(57) ABSTRACT

In an embodiment, the disclosed technologies are capable of identifying a target word within a text sequence; displaying a subset of candidate synonyms for the target word, determining a synonym selected from the subset of candidate synonyms, and replacing the target word with the selected synonym, where the subset of candidate synonyms has been created using syntactic dependency data for the target word.

20 Claims, 9 Drawing Sheets

(51) Int. Cl.
  *G06F 3/0481* (2022.01)
  *G06N 3/045* (2023.01)

(56) References Cited

U.S. PATENT DOCUMENTS

| | | |
|---|---|---|
| 2011/0201387 A1 | 8/2011 | Paek et al. |
| 2011/0202836 A1 | 8/2011 | Badger |
| 2013/0002553 A1 | 1/2013 | Colley |
| 2016/0328383 A1 | 11/2016 | Cross, III |
| 2016/0350395 A1* | 12/2016 | Gupta .................. G06F 40/289 |
| 2018/0075368 A1 | 3/2018 | Brennan |
| 2018/0107654 A1 | 4/2018 | Jung |
| 2018/0157644 A1 | 6/2018 | Mandt |
| 2018/0173690 A1* | 6/2018 | Smith .................. G06F 40/166 |
| 2018/0336183 A1 | 11/2018 | Lee |
| 2019/0147083 A1 | 5/2019 | Milligan |
| 2019/0197105 A1 | 6/2019 | Tagra |
| 2019/0220767 A1* | 7/2019 | Vigoda .................. G06N 7/01 |
| 2020/0058298 A1 | 2/2020 | Ban |
| 2020/0073996 A1 | 3/2020 | Wright |
| 2020/0089765 A1 | 3/2020 | Jayaraman |
| 2020/0110836 A1* | 4/2020 | Kumbhar ................ G06F 40/56 |
| 2020/0133967 A1 | 4/2020 | Shukla |
| 2020/0177942 A1 | 6/2020 | Wu |
| 2020/0327170 A1* | 10/2020 | Boxwell ........... G06F 16/90332 |
| 2020/0356637 A1 | 11/2020 | An |
| 2020/0379989 A1 | 12/2020 | Milligan |
| 2021/0089715 A1* | 3/2021 | Asano ................ G06F 16/3329 |
| 2021/0149963 A1 | 5/2021 | Agarwal |
| 2021/0398693 A1 | 12/2021 | Dai |

OTHER PUBLICATIONS

TensorFlow Core, "Word Embeddings", https://www.tensorflow.org/tutorials/text/word_embeddings, last viewed on Aug. 2, 2020, 2 pages.

Mikolov et al., "Distributed Representations of Words and Phrases and their Compositionality", dated Oct. 16, 2013, 9 pages.

Melamud et al., "A Simple Word Embedding Model for Lexical Substitution", Proceedings of the 1st Workshop on Vector Space Modeling for Natural Language Processing, dated Jun. 2015, 7 pages.

McCormick, Chris, "Word2Vec Tutorial—The Skip-Gram Model", http://mccormickml.com/2016/04/19/word2vec-tutorial-the-skip-gram-, dated Apr. 19, 2016, 12 pages.

Levy et al., "Dependency-Based Word Embeddings", ACL, dated 2014, 7 pages.

* cited by examiner

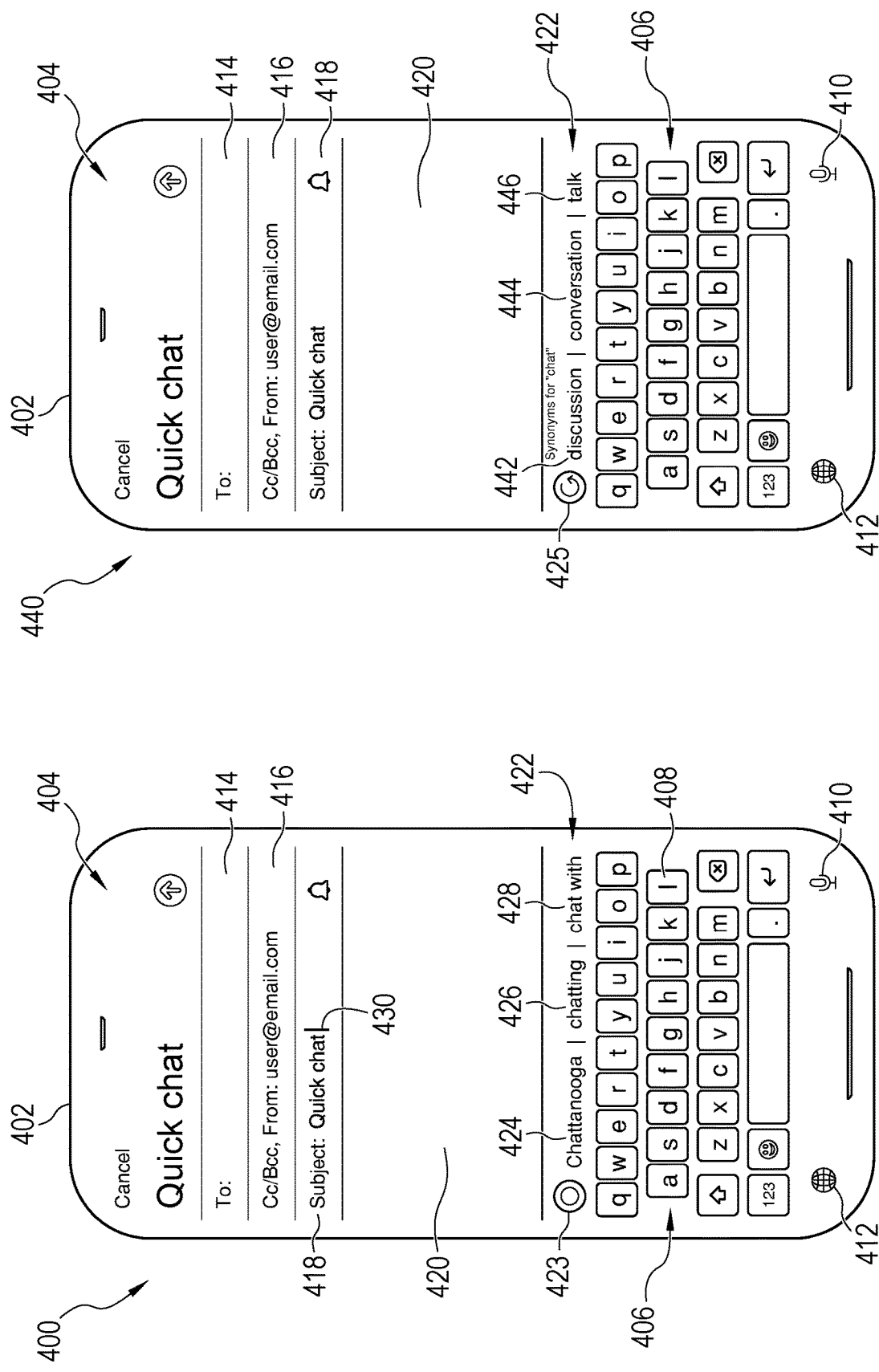

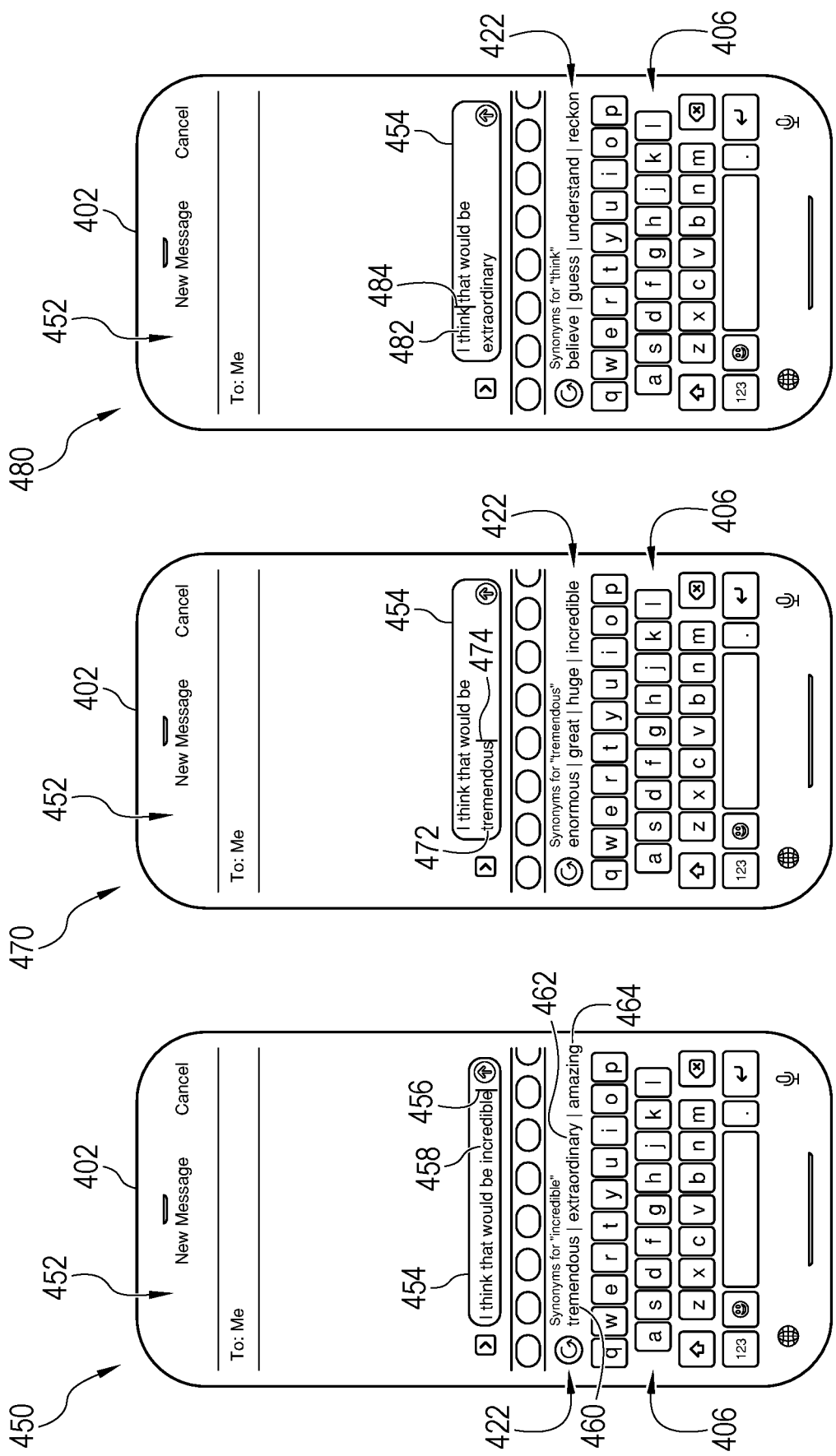

COMPUTER-IMPLEMENTED PRESENTATION OF SYNONYMS BASED ON SYNTACTIC DEPENDENCY

CROSS-REFERENCE TO RELATED APPLICATIONS

This application claims the benefit under 35 U.S.C. 120 as a continuation of application Ser. No. 17/160,193, filed Jan. 27, 2021, now U.S. Pat. No. 11,544,448, which is a continuation of application Ser. No. 16/945,453 filed Jul. 31, 2020, now U.S. Pat. No. 10,915,697, the entire contents of which are hereby incorporated by reference for all purposes as if fully set forth herein.

TECHNICAL FIELD

One technical field to which this disclosure relates is thesaurus software tools. Another technical field to which this disclosure relates is the use of syntactic dependency data to identify synonyms for a word that is part of a text sequence that has been input into a text input box of a graphical user interface. Yet another technical field is graphical input keyboards of mobile computing devices.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

A thesaurus is a resource that can be used to find synonyms of words. Dictionary websites often provide an online thesaurus service. Existing thesaurus services often require the user to explicitly identify the word for which synonyms are to be retrieved by typing the word into a special thesaurus search input box or require the user to hierarchically "browse" the thesaurus alphabetically via a series of mouse clicks. Some word processors provide a thesaurus but require the user to explicitly select the thesaurus tool from a menu bar in order to use it.

SUMMARY

The appended claims may serve as a summary of the present invention.

BRIEF DESCRIPTION OF THE DRAWINGS

FIG. 4A, FIG. 4B, FIG. 4C, FIG. 4D, and FIG. 4E are schematic diagrams of examples of user interfaces displayed on a device of the computing system of FIG. 1A

Figure 1A:
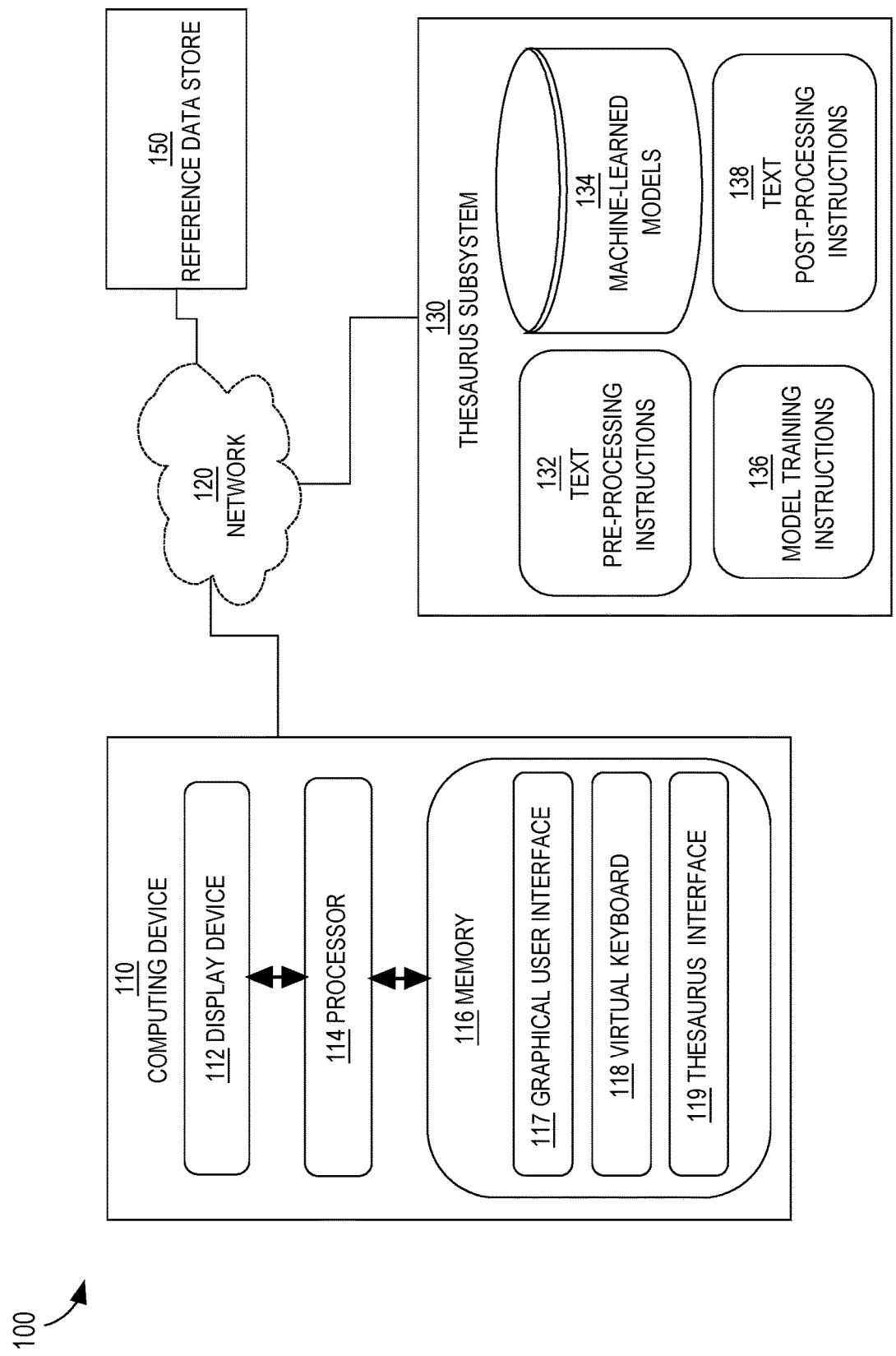
FIG. 1A is a block diagram illustrating at least one embodiment of a computing system in which aspects of the present disclosure may be implemented.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

1. Technical Problem

Existing software-based thesaurus tools, especially those that are integrated with graphical, touch-based keyboards or mobile computing devices and mobile device operating systems, are not easily accessible during text input processes such as email drafting and text message creation. Users have to stop typing, select the thesaurus option from a menu or website, and explicitly identify the word to be looked up to the thesaurus tool using a special input box of the thesaurus tool. Existing thesaurus tools often return synonyms that are irrelevant because the tools are incapable of considering the context surrounding a target word, such as the other words of the sentence containing the target word.

2. Technical Challenges

The problems associated with existing thesaurus tools are exacerbated on small form factor computing devices due to the limited on-screen real estate for displaying text and graphical user interface elements, and the small size of the keypad. Irrelevant synonyms take up valuable space on the graphical user interface while having a low likelihood of being selected by the user. Incorporating a thesaurus tool directly into text input processes has proven technically challenging due to the need to minimize latency between the user's inputting a word and the display of thesaurus output corresponding to that word while performing enough computations to ensure accuracy of the thesaurus output.

3. Technical Solutions that Address Technical Challenges

As described in more detail below, embodiments of the disclosed technologies determine a target word of a text sequence located in an input area of a graphical user interface, determine syntactic dependency data for the target word, input the syntactic dependency data to a machine learning model that has been trained using syntactic dependency training data, use the output of the machine learning model to produce a set of candidate synonyms, and provide the set of candidate synonyms to the graphical user interface.

4. Benefits

Incorporating thesaurus capabilities in-line with text input processes allows the text editing program to automatically suggest and insert synonyms continuously while the user is typing, without requiring the user to look away from the area in which text is being typed. The disclosed technologies do not require the user to explicitly select the thesaurus tool from a menu. Thus, embodiments of the disclosed technologies can display synonym suggestions even if the user has not explicitly sought to use the thesaurus service.

In experiments, a mobile device implementation of the disclosed technologies was capable of automatically producing high-accuracy synonym suggestions within a range of about 10 milliseconds of detecting the target word, with all processing performed on the mobile device.

Computer System Overview

FIG. 1A illustrates a computing system in which embodiments of the features described in this document can be implemented. In the embodiment of FIG. 1, computing system 100 includes a computing device 110, a thesaurus subsystem 130, and a reference data store 150. In some embodiments, thesaurus subsystem 130 and reference data store 150 are stored in memory 116 on computing device 110. In other embodiments, thesaurus subsystem 130 and/or reference data store 150 are coupled to computing device 110 by a network 120.

Figure 5:
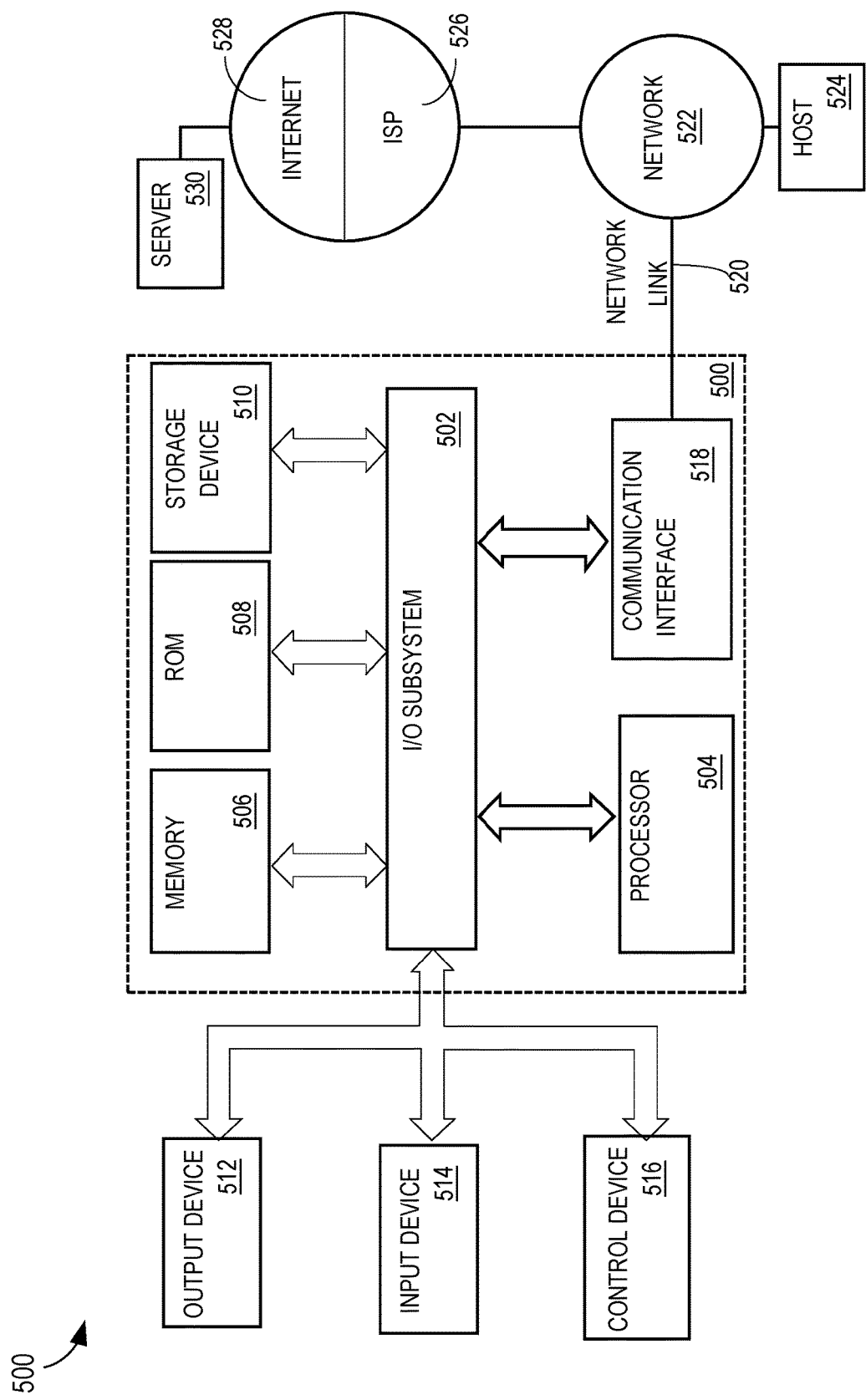
FIG. 5 is a block diagram illustrating an embodiment of a hardware system, which may be used to implement various aspects of the computing system of FIG. 1A.

Computing device 110 is a personal computing device such as a laptop or tablet computer, a mobile computing device such as a smartphone, a smart appliance, or a server. Computing device 110 includes at least one display device 112, at least one processor 114 communicatively coupled to display device 112, and memory 116 communicatively coupled to processor 114. Processor 114 is capable of executing computer program instructions including graphical user interface 117, virtual keyboard software 118, and thesaurus interface software 119 to cause rendering of various graphical user interface elements on the display device 112, to collect input data via display device 112 and to display output data on the display device 112. Examples of hardware components that may be included in computing device 110 are shown in FIG. 5, described below.

At least one software application, including graphical user interface 117, virtual keyboard 118, and thesaurus interface 119, are stored in memory 116 of computing device 110. Graphical user interface 117 obtains or produces digital text sequences. Graphical user interface 117 is any type of user interface including a graphical user interface through which written or typed words may be received as text and/or a voice interface through which spoken words may be received via audio signals containing speech and converted to text by, for example, a speech to text engine such as an automated speech recognition engine. Examples of software applications of which graphical user interface 117 may be a part include email programs, instant messaging programs, social media programs, and any type of software that has text input and editing capabilities.

Graphical user interface 117 may include at least one text data entry control element and/or at least one voice data entry control element, such as a text input box or a button, that can receive verbal content which is, or is converted to, a text sequence that is stored in computer memory in digital form. Alternatively or in addition, graphical user interface 117 may provide an application program interface (API) that allows executing programs or processes of computing device 110 to make text sequences available for processing by other applications or services. For example, thesaurus interface 119 may provide data received by computing device 110 via graphical user interface 117 or virtual keyboard 118 to thesaurus subsystem 130 or receive data from thesaurus subsystem 130 and provide the received data to the graphical user interface 117 or virtual keyboard 118.

In computing device 110, virtual keyboard 118 is implemented as part of graphical user interface 117 or as a plugin to the graphical user interface 117. Virtual keyboard 118 is software that causes display device 112 to render a software keypad or keyboard on a touchscreen display of display device 112 such that particular keys or buttons of virtual keyboard 118 are responsive to force applied to the touchscreen display in the location of the key or button. Examples of force applied include a user tapping with a finger or stylus. A virtual keyboard may take the form of a QWERTY keyboard or an abbreviated version of such a keyboard, for example.

Thesaurus interface 119 is part of the graphical user interface 117 or virtual keyboard 118 or is a plugin to the graphical user interface 117 or virtual keyboard 118. For example, thesaurus interface 119 may be implemented as an alternative mode of virtual keyboard 118. As described below, an embodiment of virtual keyboard 118 is programmed to automatically switch to thesaurus interface 119 in response to virtual keyboard 118 detecting a trigger signal such as a particular cursor position.

A digital text sequence is a sequence of two or more words or tokens that can be produced by a computer user typing or speaking words into the graphical user interface 117. For example, a user may generate a digital text sequence using a keyboard or keypad and a text editor, a word processor, an electronic messaging program, a command-line interface, or a control element of graphical user interface 117. The term user, as used herein, may refer to at least one human person interacting with a computing device, or may refer to an automated process that has been configured to output synthesized speech or natural language text. For instance, a bot, a personal digital assistant, or a robot may be a user, in some embodiments.

In another example, a digital text sequence is created by a computer extracting text from a digital content item, such as a document, a message, a social media posting, a list of search results, a web page, or another source of text stored in digital form. A digital text sequence can also be produced by speech-to-text software transcribing words that have been spoken by a user in the vicinity of a microphone that is operably coupled to computing device 110.

Thesaurus subsystem 130 is stored on and part of computing device 110 or is bi-directionally communicatively coupled to computing device 110 and reference data store 150 by network 120, in an embodiment. Thesaurus subsystem 130 executes automated machine learning-based thesaurus look-up processes on digital text sequences, including but not limited to digital text sequences received from computing device 110. Thesaurus subsystem 130 performs thesaurus look-up functions using a machine-learned model that has been trained on syntactic dependency training data, as described in more detail below.

In some embodiments, thesaurus subsystem 130 may be implemented using a client-server approach. A client portion of thesaurus subsystem 130 may operate in computing device 110, for example as a plugin or widget in graphical user interface 117 or virtual keyboard 118, or as a web browser executing graphical user interface 117 or virtual keyboard 118. In an embodiment, a web browser may transmit an HTTP request over a network (e.g., the Internet) in response to user input (e.g., entering a text sequence) that is received through a user interface provided by the web application and displayed through the web browser. A server portion of thesaurus subsystem 130 may receive the input, perform at least one operation to analyze the input, and return at least one modified version of the input using an HTTP response that the web browser receives and processes.

In the embodiment of FIG. 1A, thesaurus subsystem 130 includes text pre-processing instructions 132, machine-learned models 134, model training instructions 136, and text post-processing instructions 138. An overview of text pre-processing instructions 132, machine-learned models 134, model training instructions 136, and text post-processing instructions 138 is provided below. Functions performed by these software components are described in more detail with reference to FIG. 1B, FIG. 2, and FIG. 3.

Text pre-processing instructions 132 are embodied as computer programming code stored in computer memory that when executed cause a computing device to operate a text pre-processing function of a software-based thesaurus service. In an embodiment, text pre-processing instructions 132 pre-process a text sequence that includes a target word using a syntactic parser that outputs the text sequence including the target word tagged with part of speech identifiers and dependency identifiers. Text pre-processing instructions 132 are in bidirectional digital communication with machine-learned models 134 as needed to operate the software-based thesaurus service.

In an embodiment, machine-learned models 134 include a word model and a context model. The word model is a neural network-based model that has machine-learned semantic embeddings of words. An example of a word model is WORD2VEC. The context model is a neural network-based model that has machine-learned semantic embeddings of syntactic dependency data produced for various text sequences and their respective target words, as reflected in the training data.

In an embodiment, text post-processing instructions 138 perform any needed post-processing on the output of machine-learned models 134. An example of post-processing that may be performed by a computing device executing post-processing instructions 138 involves using the output of machine-learned models 134 to select a subset of candidate synonyms for display in graphical user interface 117, which may include similarity score computations and ranking, for example. Text post-processing instructions 138 are in bidirectional digital communication with machine-learned models 134 as needed to operate the software-based thesaurus service.

Model training instructions 136 are embodied as computer programming code stored in computer memory that when executed cause a computing device to perform training of machine-learned models 134 by causing inputting of particular sets of training data into models 134. An individual training example includes a text sequence and a target word, where the target word is contained in the text sequence.

To train machine-learned models 134; for example word model 164 and context model 172, described below, model training instructions 136 incorporates a noise contrastive estimation, negative sampling model training approach, in an embodiment. To do this, the set of training data for each model includes a small number of positive training instances and a large number of negative training instances. As used here, a positive instance is an example in which the target word fits the surrounding context, and a negative instance is an example in which the target word does not fit the surrounding context. An example of a positive training instance is the text sequence, "Hello my dear friend" where "dear" is the target word and "dear" fits the word context of the surrounding words of the text sequence. Examples of negative training instances using the same text sequence include, "Hello my avocado friend" and "Hello my velociraptor friend." A 0 or 1 may be used to indicate whether a particular training instance is positive or negative.

A word model like WORD2VEC uses only the closest words surrounding the target word to predict the semantics of the target word; for example, words that are within about 3-5 tokens of the target word. Thus, a complete instance of training data may include the target word, the word context, and a binary label. For example: (target_word=dear; word_context=my, friend; 1) or (target word=avocado, word_context=my, friend; 0).

A distance between words that is greater than about 3-5 tokens is considered "far context" and the word model is unable to account for far context. Also, with the word model, the semantics of the target word are derived only from the surrounding words. For these reasons, the word model by itself does not reliably predict synonyms. To illustrate, in the text sequence, "The weather was _____," both "good" and "bad" fit the text sequence, semantically, and so would be close to each other in the semantic space, but they are not synonyms. Also, the text sequence "Coffee, I think, was not very" when analyzed by the word model would not include the word "Coffee" in the surrounding context because its position in the text sequence is too far away from the target word. In this case, the words, "big" and "hot" would be close to each other in the semantic space (i.e., have similar word vectors) even though they are not synonyms, because, without considering the word "Coffee," they both semantically fit the text sequence.

A dependency context model such as context model 172 corrects for the shortcomings of WORD2VEC as applied to the problem of finding synonyms. To create training data for a dependency context model, a text sequence is pre-processed by a dependency parser computer program, which tags words in the text sequence with parts of speech and syntactic dependency relationships.

Figure 1B:
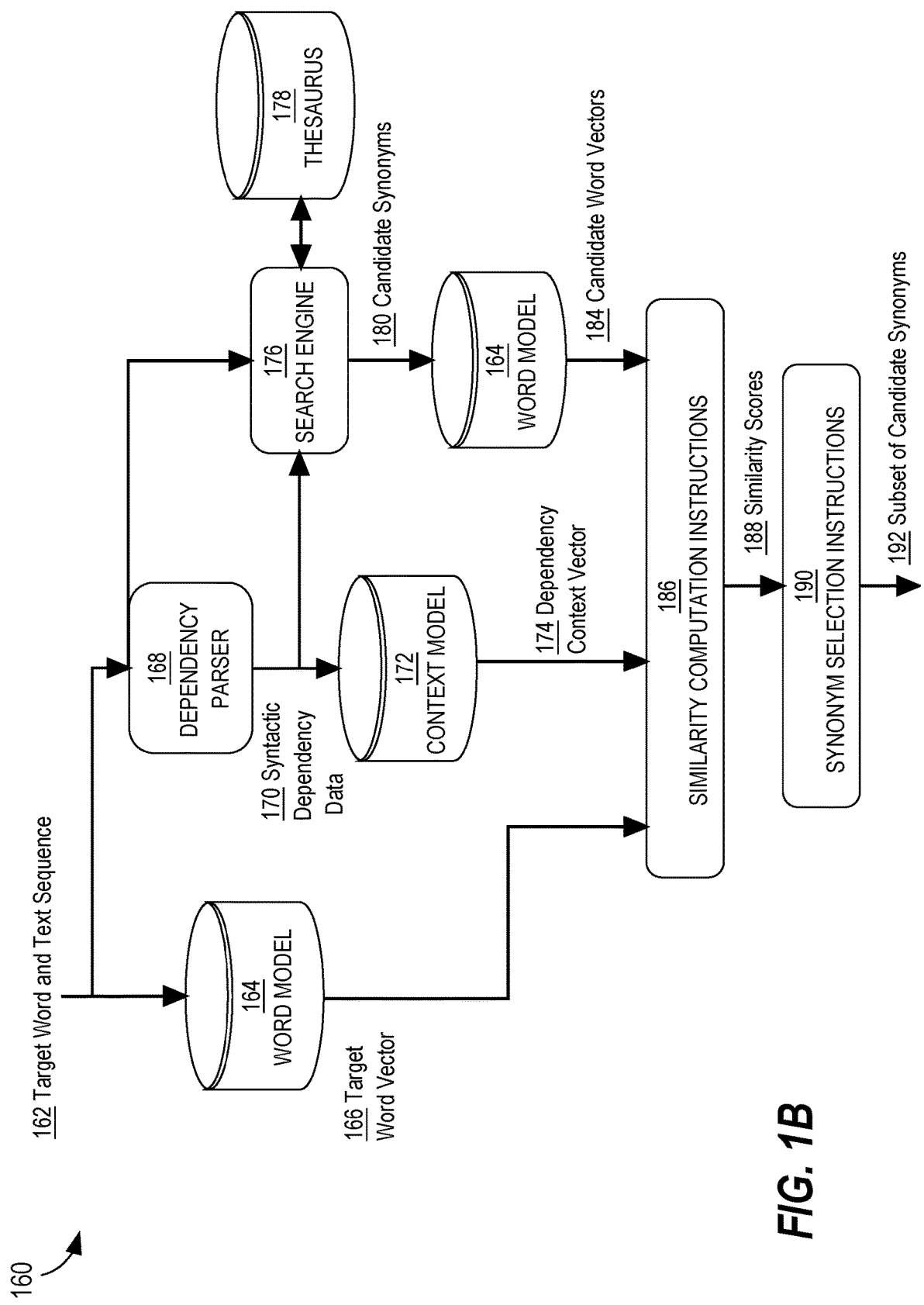
FIG. 1B is a flow diagram of a process that may be executed by at least one device of the computing system of FIG. 1A.
Figure 1C:
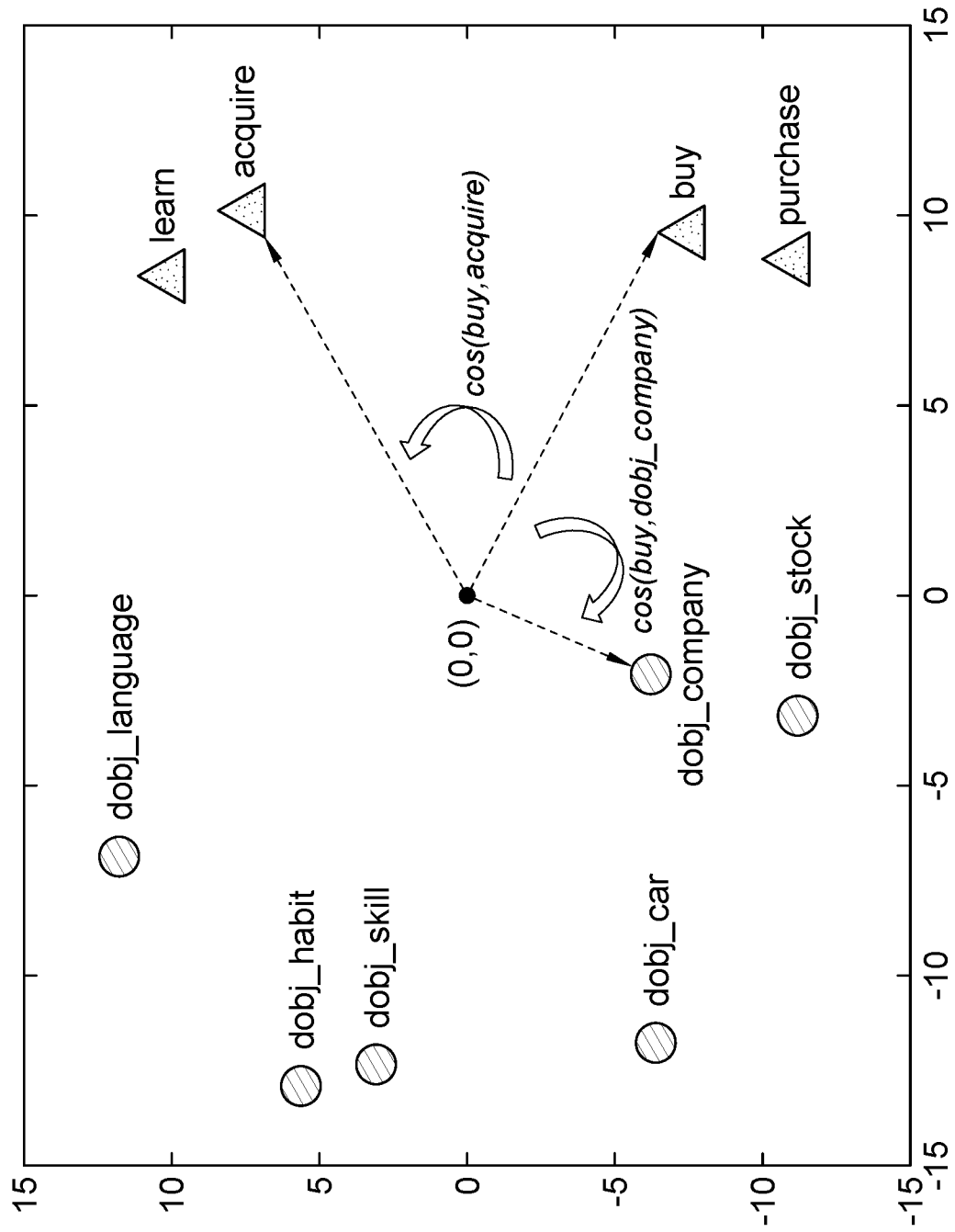
FIG. 1C is an example of a plot of a semantic space including target words and dependency contexts.
Figure 1D:
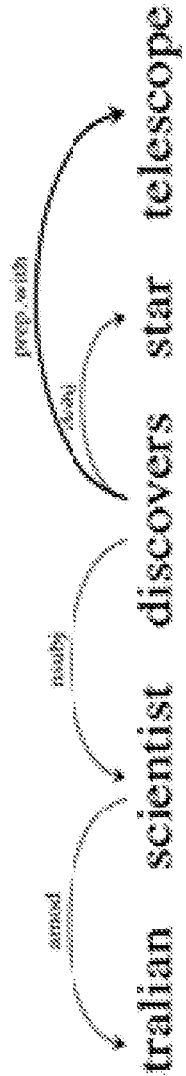
FIG. 1D is an example chart of dependency contexts for words of a sentence.

FIG. 1D shows an example of a training text sequence, its syntactic dependency data, and, for each word in the text sequence, its syntactic dependency contexts. FIG. 1D shows that any word of a text sequence can have multiple dependency contexts, and that far context is considered. For example, the word "telescope" has a syntactic dependency with the word "discovers" even though "telescope" and "discovers" are distanced from each other by the word "star" in the text sequence.

The dependency contexts are used to train the dependency context model. For example, an instance of training data used to train the dependency context model could include (target_word=telescope; dependency_context=discovers_prep_with$^{-1}$; 1). In this example, the "prep_with" label is a predefined label that indicates the type of syntactic dependency and the "−1" indicates that the dependency is on a preceding word in the text sequence. In other words, the presence or absence of the "−1" indicates the direction of the syntactic dependency.

After training, each of the machine-learned models 134 has learned whether particular target words do or do not fit the context provided by the rest of the training text sequence. For the word model, only the words of the text sequence are provided as the training data. For the context model, words of the text sequence and syntactic dependency data are provided as the training data.

Embedding as used herein may refer to the process of generating a representation of an input with associated features, and the representation may be stored in computer memory as a feature vector. That is, a trained machine-learned model may receive as input a text sequence and a target word, and, in response to the input of the text sequence and the target word, output a feature vector that indicates a semantic representation of the target word given the input text sequence. Depending on the features that are used, the feature vector provides information about the input text. For example, each dimension of a feature vector may indicate semantic and/or syntactic information about the word; for instance, one dimension may indicate information about a meaning of the word, another dimension may indicate a position of the word in a sentence, and another dimension may indicate a word that typically precedes or typically follows the word in a sentence.

In general, model as used herein may refer to a combination of computer programming code in which at least one decision-making algorithm is expressed; i.e., a machine learning algorithm, and at least one computer-implemented data structure that stores data and/or parameters used by the model.

Reference data store 150 is, in an embodiment, at least one digital data store that stores digital thesaurus data and data sets used to train machine-learned models 134. In an embodiment, reference data store 150 includes at least one searchable database storing digital thesaurus data, which may be licensed from one or more commercial providers of thesaurus information.

Each of the computing device 110, thesaurus subsystem 130, and reference data store 150 is implemented using at least one computing device and may be communicatively coupled to an electronic communications network 120. Computing device 110 is configured to communicate bidirectionally with at least thesaurus subsystem 130, for example over a bus or network 120. Thesaurus subsystem 130 is configured to communicate bidirectionally with at least computing device 110 and reference data store 150, for example over a bus or network 120. Examples of communicative coupling mechanisms include inter-process communication (IPC) interfaces and application program interfaces (APIs).

The features of computing device 110, thesaurus subsystem 130, and reference data store 150 are implemented using computer software, hardware, or software and hardware, and may include combinations of automated functionality, data structures, and digital data, which are represented schematically in FIG. 1A. Computing device 110, thesaurus subsystem 130, and reference data store 150 are shown as separate elements in FIG. 1A for ease of discussion but the illustration is not meant to imply that separation of these elements is required. The illustrated systems and data stores (or their functionality) may be divided over any number of physical systems, including a single physical computer system, and can communicate with each other in any appropriate manner.

Machine-learned models 134 and reference data store 150 may each reside on at least one persistent and/or volatile storage devices that may reside within the same local network as at least one other device of computing system 100 and/or in a network that is remote relative to at least one other device of computing system 100. Thus, although depicted as being included in computing system 100, machine-learned models 134 and/or reference data store 150 may be part of computing system 100 or accessed by computing system 100 over a network, such as network 120.

Logical connection as used in this disclosure may refer to a flow of digital information or data communication that is established between two devices on a network by network software communicating with, for example, the devices' operating systems either directly or by a virtual machine. Examples of protocols that may be used to establish a logical connection include hypertext transfer protocol (HTTP) and secure sockets layer (SSL).

Network 120 may be implemented on any medium or mechanism that provides for the exchange of data, signals, and/or instructions between components 110, 130, 150 of system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Example of System Operation

FIG. 1B is a simplified flow diagram of an embodiment of operations that can be performed by at least one device of a computing system. The operations of a flow 160 as shown in FIG. 1B can be implemented using processor-executable instructions that are stored in computer memory. For purposes of providing a clear example, the operations of FIG. 1B are described as performed by computing system 100, but other embodiments may use other systems, devices, or implemented techniques.

In FIG. 1B, the computing system receives a target word and text sequence 162, where the target word is contained in the text sequence. For purposes of illustration, suppose the text sequence is "ABC would be a great company to acquire!" and the target word is "acquire." That is, the computing system is to determine appropriate synonyms for the word, "acquire." The target word and text sequence 162 are processed by word model 164, dependency parser 168, and search engine 176. Word model 164 receives the target word and text sequence 162 as input and outputs a word-based semantic embedding for the target word, "acquire." The word-based semantic embedding is output as target word vector 166. For purposes of illustration, suppose the word vector for "acquire" is [10,8], which indicates the location of the word "acquire" in the semantic space that has been defined by the training data used to train word model 164.

Dependency parser 168 analyzes the target word and text sequence 162 and outputs syntactic dependency data 170. Syntactic dependency data 170 indicates syntactic dependencies for the target word and may also indicate parts of speech. For purposes of illustration, suppose the syntactic dependency data 170 is "company_dobj," meaning that the word "company" is a direct object of the word "acquire."

The syntactic dependency data 170 output by dependency parser 168 is input to context model 172. Context model 172 has been trained using syntactic dependency training data as described above. Context model 172 outputs a dependency context vector 174, which indicates the location in the semantic space of the word "company" when it is the direct object of the word "acquire," where the semantic space has been defined by the training data used to train context model 172. For purposes of illustration, suppose the dependency context vector 174 for "company_dobj" is [−3, −6].

The syntactic dependency data 170 and the target word and text sequence 162 are input as search parameters into a search engine 176. Search engine 176 converts the search parameters into a query using for example SQL (Structured Query Language), which the computing system can use to search the searchable database thesaurus 178 and retrieve candidate synonyms 180 for the target word. Thus, in some embodiments, portions of the dependency context can be used to determine the search query used to identify candidate synonyms for a target word.

The candidate synonyms 180 are input into the word model 164 and word model 164 outputs a candidate word vector 184 for each candidate synonym 180. A candidate word vector 184 is similar to target word vector 166 except that the candidate word vector 184 is determined for a candidate synonym rather than for the target word. For purposes of illustration, suppose the candidate synonyms for the target word "acquire," retrieved from the thesaurus 178, are "learn," "purchase," and "buy;" the word vector for "learn" is [8,10], the word vector for "purchase" is [10, −10], and the word vector for "buy" is [10,−7].

FIG. 1C is an example of a plot of a semantic space showing the relative positions within the semantic space of the target word, "acquire," the candidate synonyms, and the dependency context for the target word in relation to other dependency contexts found in the context model. The coordinates of each item in the semantic space on the x and y axes are representative of semantic meaning. The ranges of values on the x and y axes and coordinate values are determined through model training and are influenced by the training data. FIG. 1C also illustrates a use of cosine similarity to determine that of the available candidate synonyms for "acquire," "buy" is the best (most semantically similar) choice given the dependency context dobj_company.

Target word vector 166, dependency context vector 174, and candidate word vector 184 are input into similarity computation instructions 186. Similarity computation instructions 186 are programmed to compute a similarity score 188 for each of the candidate synonyms 180 and each of the dependency contexts. A similarity score 188 indicates how semantically similar a candidate synonym is to the target word. A higher similarity score indicates greater semantic similarity in some embodiments, although depending on the type of computation used to compute the score, a lower score may indicate greater semantic similarity in other embodiments. To compute a similarity score, some embodiments of similarity computation instructions 186 use a formula such as: dot(target_word_vector, candidate_synonym_word_vector)+dot(dependency_context_vector, candidate_synonym_word_vector), where "dot" indicates a dot product (vector product) computation.

Similarity computation instructions 186 output similarity scores 188. Similarity scores 188 are processed by synonym selection instructions 190. In an embodiment, synonym selection instructions 190 ranks similarity scores 188 in rank order; for example, descending order, and selects the top k similarity scores, where k is a positive integer that indicates the number of synonyms to be suggested to the user via the graphical user interface. In an embodiment, k is in the range of about 2 and less than or equal to 5. K may be increased or decreased to accommodate the size limitations of the display device used to display the candidate synonyms. For example, k may be smaller for mobile app versions of the software and larger for tablet or laptop versions of the software.

Synonym selection instructions 190 map the top k similarity scores back to their corresponding synonyms and outputs a subset of candidate synonyms 192. The subset of candidate synonyms 192 is a subset of the set of candidate synonyms 180 retrieved from thesaurus 178, but may include all of the same synonyms as the set of candidate synonyms 180 arranged in a rank order. Because the similarity scores take dependency context into consideration, the rank order will vary when dependency context varies. Table 2 shows examples of how the rank order of candidate synonyms varies according to dependency context.

TABLE 2

Examples of Synonyms Suggested Based on Dependency Context.

| Text Sequence with Target Word in Bold | Suggested Synonyms in Ranked Order |
|---|---|
| Looking good and feeling great is just a bonus! | great \| excellent \| healthy |
| My goal is a good Tamil language. | excellent \| great \| solid |
| Learning aids to support the transition to new applications. | assist \| defend \| help |
| Thank you for your support, inspiration, and encouragement | assistance \| sustenance \| backing |

In the first example of Table 2, great and excellent are both candidate synonyms for the target word "good" but "great" has been ranked higher and thus displayed first in the order of display of candidate synonyms, given the dependency context of "good" in the first text sequence. In the second example, the dependency context of "good" is different than in the first example, and "excellent" is ranked higher and thus displayed before "good" in the order of display of the candidate synonyms. The third and fourth examples illustrate that the effect of dependency context can result in different sets of candidate synonyms being generated for the same target word, "support," in two different text sequences.

Example of Synonym Selection Process

Figure 2:
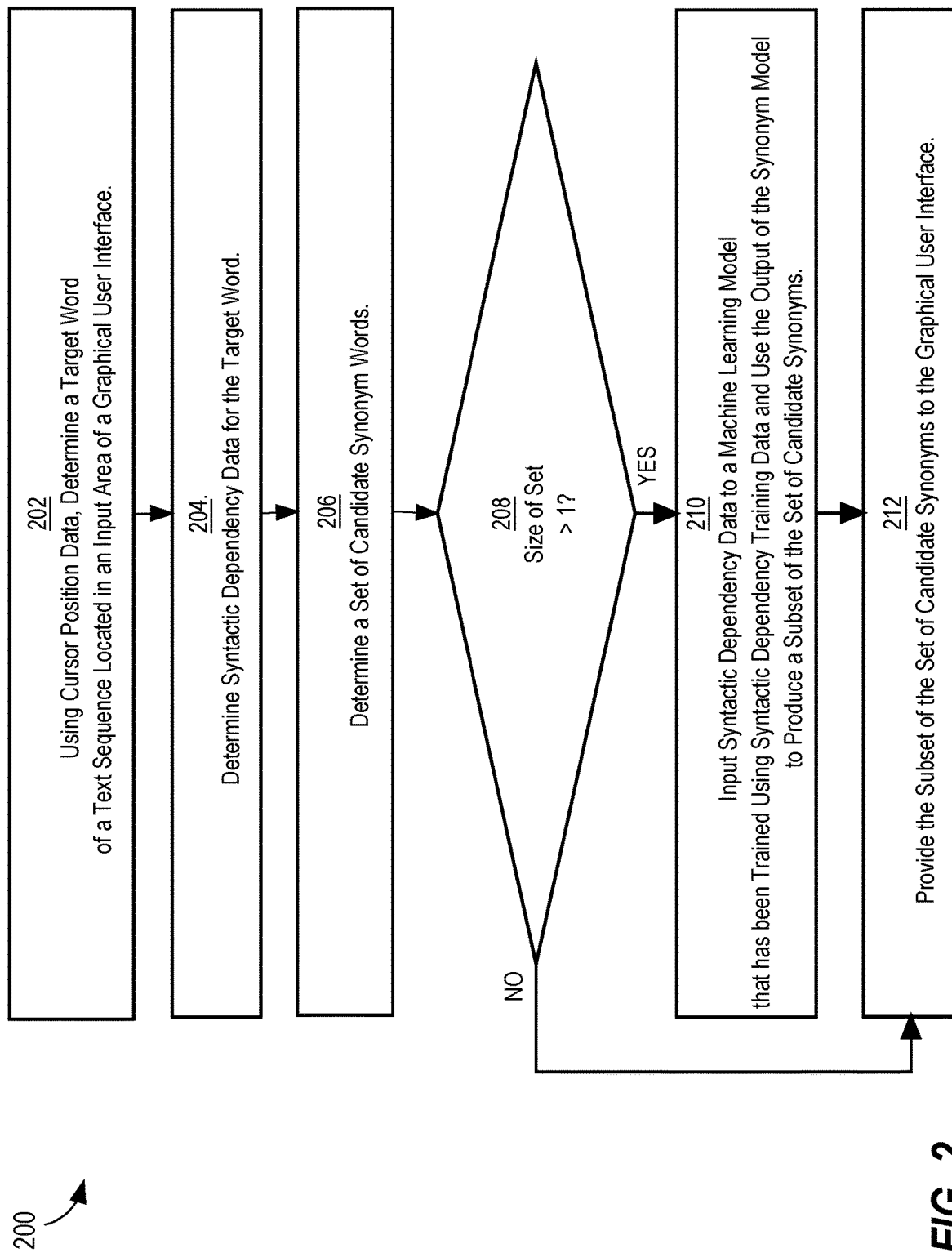
FIG. 2 is a flow diagram of a process that may be executed by at least one device of the computing system of FIG. 1A.

FIG. 2 is a simplified flow diagram of an embodiment of operations that can be performed by at least one device of a computing system. The operations of a flow 200 as shown in FIG. 2 can be implemented using processor-executable instructions that are stored in computer memory. For purposes of providing a clear example, the operations of FIG. 2 are described as performed by computing system 100, but other embodiments may use other systems, devices, or implemented techniques.

Operation 202 when executed by at least one processor receives an input text sequence from a software application, such as graphical user interface 117 or another software application running on computing device 110 or another device. Examples of computer program-based mechanisms by which operation 202 may receive the input text sequence include an HTTP request and an API. An example of an input text sequence is a sentence or a portion of a sentence.

In operation 202, computing system 100 uses cursor position data to determine a target word within the text sequence, where the text sequence is located and displayed in an input area of a graphical user interface. Cursor position data may refer to the on-screen coordinates of a cursor within a text input box of a graphical user interface. A target word is identified as the word immediately before or immediately after the cursor, or if the cursor is positioned on a word, that word is determined to be the target word. If the cursor is in between two words, computing system 100 may determine that the most recently typed word is the target word. Cursor position data and target word data are obtained, for example, by an HTTP request to graphical user interface 117. Examples of input areas, cursor positions, and target words are shown in FIG. 4A, FIG. 4B, FIG. 4C, FIG. 4D, and FIG. 4E, described below.

Operation 204 when executed by at least one processor determines syntactic dependency data for the target word. Examples of syntactic dependency data are described above with reference to FIG. 2B. Syntactic dependency data is generated by a syntactic parser. A syntactic parser is software that extracts features from text sequence using natural language processing techniques. Examples of features of the text sequence include raw features such as n-grams, tokens, words, word pairs, phrases, and chunks of the text sequence. The syntactic parser analyzes the raw features using, for example, a statistical model and/or a set of syntactic rules, and produces computed features, such as part-of-speech tags and dependency relation data, associated with the raw features. For example, computed features may include dependency relation data associated with particular word pairs or phrases of the first portion of the text sequence. Computed features may also include part of speech data such as annotations that identify the part of speech of a particular word of the text sequence. Computed features may be associated with raw features by, for example, annotating portions of the raw features with the corresponding computed features. As used herein, raw features and computed features may be referred to collectively as features.

Operation 206 when executed by at least one processor determines a set of candidate synonym words. The candidate synonyms may be retrieved from a reference data store, such as by querying a thesaurus database using the target word as a search term. Alternatively or in addition, portions of the syntactic dependency data determined by operation 204 may be included in the query or used to filter the query.

At operation 208, computing system 100 determines whether there is more than one candidate synonym. If there is only one candidate synonym, computing system 100 proceeds to operation 212. If there are at least two candidate synonyms, computing system 100 proceeds to operation 210.

Operation 210 when executed by at least one processor inputs the syntactic dependency data determined in operation 204 into a dependency context machine learning model, which has been trained using syntactic dependency training data. The dependency context machine learning model used by operation 210 produces a semantic context embedding; for example a context vector, for the syntactic dependency data for the target word. Operation 210 uses the output of the dependency context machine learning model, the context vector, along with semantic word embedding data for the target word and semantic word embedding data for each candidate synonym, to produce a subset of the set of candidate synonyms. In an embodiment, operation 206 computes similarity scores for each candidate synonym word. The similarity scores are computed using the syntactic dependency data produced by operation 204 and a vector multiplication or cosine similarity. Examples of similarity score computations are described with reference to FIG. 1B. Operation 210 selects a subset of the candidate synonyms based on the similarity scores. Operation 210 may order the candidate synonyms in a particular order; for example in descending order of similarity score, where a high score corresponds to a high degree of similarity.

In an embodiment, context vectors produced by operation 210 are not stored in memory in raw matrix form. Rather, the context vectors are compressed using a formula such as $|[\text{hash}(c) \mod 2^d \text{ in Contexts}]|$ where c is a context vector in the set of context vectors Contexts for the target word, and d is the number of dimensions in the context vector. In some embodiments, hashing the context vectors enables the data to be stored locally on a mobile device.

Operation 212 when executed by at least one processor provides the subset produced by operation 210, of the set of candidate synonyms produced by operation 206, to the graphical user interface of operation 202. The synonyms in the subset may be displayed in an output area of the graphical user interface from which the user can view and select a synonym to be included in a text sequence in place of the target word.

Example of In-Line Switching to Thesaurus Service

Figure 3:
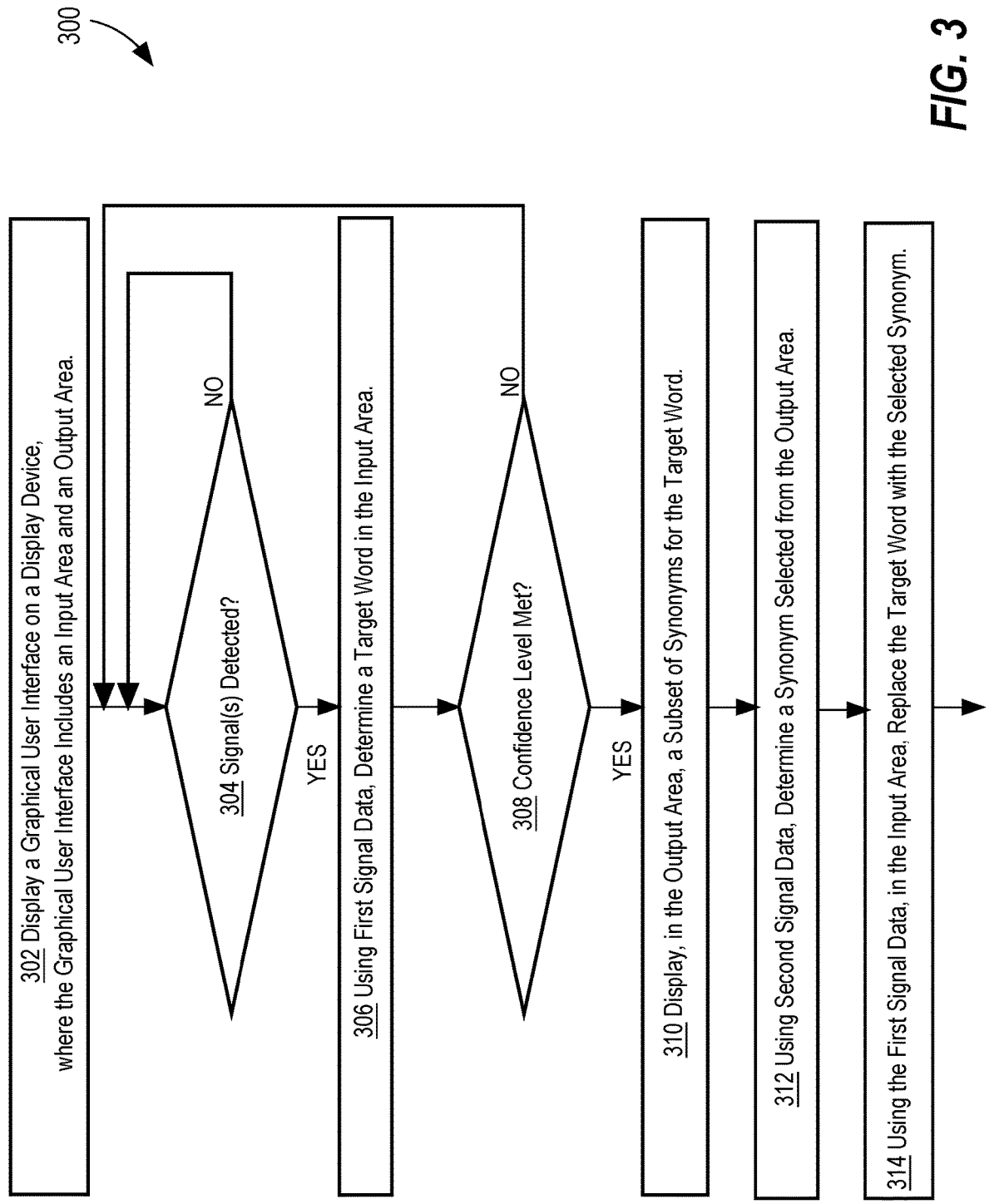
FIG. 3 is a flow diagram of a process that may be executed by at least one device of the computing system of FIG. 1A.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems or implemented techniques.

Operation 302 when executed by at least one processor causes a display device to display a graphical user interface that includes an input area and an output area. Examples of graphical user interfaces, input areas, and output areas are shown in FIG. 4A, FIG. 4B, FIG. 4C, FIG. 4D, and FIG. 4E, described below.

Operation 304 when executed by at least one processor monitors the graphical user interface for a signal to launch the synonym service. In an embodiment, operation 304 monitors an input area in which a cursor is positioned. Operation 304 determines the position of the cursor relative to any surrounding text and/or measures the time interval, or amount of time that has elapsed, since the last cursor movement. For example, operation 304 determines that the user has stopped typing at the end of a target word if there is no cursor movement for x seconds, where x is a positive integer between 0 and 2 or about 2. Alternatively or in addition, operation 304 determines that the user has placed the cursor on or near a target word, and the action of detecting that the cursor is on or near a word is sufficient for operation 304 to launch the synonym service without further delay.

Launching the synonym service is implemented, for example, by operation 304 initiating a context switch to switch a virtual keyboard to a thesaurus mode from a default mode or another mode, for example. The context switch from another mode to the thesaurus mode initiates analysis of the text sequence containing the target word and generation of candidate synonyms.

If at operation 304 no signal to switch to thesaurus mode is detected, computing system 100 waits for a signal. If a signal is detected, computing system 100 proceeds to operation 306. Operation 306 when executed by at least one processor determines a target word in the input area using the signal data detected at operation 304. The signal data detected at operation 304 includes cursor position data, and thus operation 306 determines the target word based on the cursor position data. For instance, operation 306 identifies the target word as the word most recently typed and nearest to the cursor position at the time the signal was detected.

Following operation 306, the target word is processed in the manner described above with reference to FIG. 1B and/or FIG. 2. That is, dependency context data is determined, candidate synonyms are determined, and similarity scores are generated for each candidate synonym.

In operation 308, computing system 100 determines whether a confidence level value has been met. An example of a confidence level being met is a determination that at least one of the similarity scores computed following operation 306 matches a criterion, for example, if a similarity score exceeds a threshold score value. If the confidence level is met, computing system 100 proceeds to operation 310. If the confidence level is not met, computing system 100 does not return any synonym suggestions and returns to operation 304 to wait for another signal.

In operation 310, computing system 100 displays a subset of synonyms for the target word in the output area of the graphical user interface, where the synonyms and order of display have been determined by the processes of and following operation 306.

In operation 312, computing system 100 determines a synonym selected from the output area using second signal data. Examples of second signal data include a signal from a touch-sensitive membrane or sensor of the computing device indicating that a force was applied to a particular area of the display screen or that a mouse click was detected. The coordinates of the on-screen location at which the signal was detected are used to determine the selected synonym.

In operation 314, computing system 100 replaces, in the input area, the target word determined in operation 306 with the synonym selected in operation 312. The user may continue typing and as the user continues typing, the thesaurus service may be invoked again if the requisite signal is detected, until the user has finished entering text in the input area. The user may signal that they have finished entering text in the input area by activating a button, such as a send button, or by moving the cursor to a different input area, or by taking some other action outside of the currently active input area.

Any operations described herein involving communicating data to the graphical user interface or obtaining data from the graphical user interface may be implemented using applicable commands or function calls provided by a mobile app development tool or, in a client server implementation, HTTP commands such as put and get, for example.

Examples of Graphical User Interface

FIG. 4A, FIG. 4B, FIG. 4C, FIG. 4D, and FIG. 4E are schematic diagrams of examples of user interfaces displayed on a device of the computing system of FIG. 1A.

FIG. 4A, FIG. 4B illustrate examples of display screens of a mobile computing device equipped with a touchscreen display 402. An email graphical user interface (GUI) 404 has been rendered on touchscreen display 402. Graphical user interface 404 is shown in a first state 400, in FIG. 4A, and in a second state 440, in FIG. 4B. The first state 400 corresponds to a default mode of a virtual keyboard, and the second state 440 corresponds to a thesaurus mode of the virtual keyboard.

In FIG. 4A, GUI 404 includes input areas 414, 416, 418, and 420, an output area 422, a virtual keyboard 406, a keyboard switch button 412, and a voice input button 410. Virtual keyboard 406 includes a set of keys 408, which together form a QWERTY keyboard. A user may cause a text sequence to be displayed in any of the input areas 414, 416, 418, 420 by tapping on the keys 408 or by speaking into a microphone of the mobile computing device while the voice input button 410 has been activated.

In FIG. 4A, the user has typed the text sequence, "Quick chat" into input area 418, the subject line of an email message. A cursor 430 is positioned after the word "chat." Initially, the virtual keyboard 406 is in the default mode, in which the output area 422 displays an animation 423 and non-synonym word suggestions 424, 426, 428 for the word, "chat." The non-synonym word suggestions 424, 426, 428 include autocomplete suggestions intended to aid the user by automatically completing the same word that the user intended to type. Thus, non-synonym word suggestions 424, 426, 428 are typically visually similar to the target word indicated by the position of cursor 430.

FIG. 4B illustrates the second state 440 of the virtual keyboard 406 after a signal to switch to thesaurus mode has been detected by the device. In the example of FIG. 4B, the signal to switch to synonym mode is a lack of position change of the cursor 430 for a threshold amount of time in the range of about 0-3 seconds or about 2 seconds. Once the cursor 430 has been detected by the system 100 as not having moved from its position next to the word "chat," the word chat is considered as a target word, and virtual keyboard 406 switches to thesaurus mode. The threshold time interval may be indicated by a change from animation icon 423 to animation icon 425. For instance, animation icon 423 may be displayed while the system 100 is counting the amount of time, and animation icon 425 may be displayed after the switch to the thesaurus mode has been completed.

In FIG. 4B, in thesaurus mode, output area 422 displays a message, "Synonyms for 'chat'" to identify the target word, and displays the top k synonyms, which have been determined by the system 100 using the technologies disclosed herein, in rank order, 442, 444, 446. If the user were to tap on any one of the synonyms 442, 444, 446 displayed in the output area 422, the system 100 would automatically replace the word "chat" with the tapped synonym, in the input area 418. For example, if the user tapped on "discussion," then the system 100 would cause input area 418 to display the text sequence, "Quick discussion" rather than "Quick chat." Notably, the user does not need to tap the keyboard switch button 412 to enter thesaurus mode; the system offers helpful synonym suggestions automatically once it has identified a target word.

FIG. 4C, FIG. 4D, and FIG. 4E illustrate examples of display screens of a mobile computing device equipped with a touchscreen display 402. An instant text message graphical user interface (GUI) 452 has been rendered on touchscreen display 402. Graphical user interface 452 is shown in a first state 450, in FIG. 4C, and in a second state 470, in FIG. 4D, and in a third state 480, in FIG. 4E. Each of the states 450, 470, 480 corresponds to a different operational state of a thesaurus mode of a virtual keyboard; for example, a different state of program execution.

In FIG. 4C, FIG. 4D, and FIG. 4E, GUI 452 includes an input area 454, an output area 422, a virtual keyboard 406, and a keyboard switch button and a voice input button as well. Virtual keyboard 406 includes a set of keys, which together form a QWERTY keyboard.

In FIG. 4C, a user has typed the text sequence, "I think that would be incredible" into input area 454. The system 100, already in thesaurus mode, has identified "incredible" as the target word 458 based on receiving input to change the position of cursor 456 to a position immediately after the end of the word, "incredible." In response to identification by the system 100 of the target word, the system 100 has determined the top k synonyms 460, 462, 464 for the target word using the techniques described herein, and displayed the top k synonyms 460, 462, 464 for the target word in rank order in the output area 422. Notably, as described above, the system 100 does not display all synonyms retrieved from the thesaurus database for the target word but only the top k synonyms determined using the techniques disclosed herein.

FIG. 4D shows the results after the user has tapped on the synonym 460, "tremendous" in FIG. 4C. The user selection of synonym 460 causes synonym 460 to replace the target word 458 in the input area 454. Based on the length of time that the cursor has remained in cursor position 474, the system has generated a new set of top k synonyms using the disclosed technologies, for the new target word 472 ("tremendous"). Thus, the sequence of states depicted by FIGS.

4C and 4D illustrate that the disclosed thesaurus feature can operate in a recursive manner.

FIG. 4C illustrates a case in which the signal for the system to generate a set of top k synonyms is the user selection of a target word in the input area 454. Here, the user has actively positioned the cursor at a cursor position 484 that is immediately after the word "think." In response to cursor position 484, the system identifies "think" as the new target word 482, generates a new set of top k synonyms for the target word 482, and displays the new set of top k synonyms in the output area 422. The user can cause the system to generate a set of top k synonyms for any word of the text sequence displayed in input area 454 by changing the cursor position within the input area 454.

The features and functionality illustrated by the GUI of FIG. 4A and FIG. 4B also may be available in the GUI of FIG. 4C, FIG. 4D, and FIG. 4E, in some embodiments; and the features and functionality illustrated by the GUI of FIG. 4C, FIG. 4D, and FIG. 4E also may be available in the GUI of FIG. 4A and FIG. 4B, in some embodiments. That is, the thesaurus capabilities described herein are not limited to either email applications or text messaging applications. Any of the thesaurus capabilities described herein can be implemented in conjunction with any software application that provides text editing capabilities.

Implementation Example—Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

For example, FIG. 5 is a block diagram that illustrates a computer system 500 upon which an embodiment of the present invention may be implemented. Computer system 500 includes a bus 502 or other communication mechanisms for communicating information, and a hardware processor 504 coupled with bus 502 for processing information. Hardware processor 504 may be, for example, a general-purpose microprocessor.

Computer system 500 also includes a main memory 506, such as random-access memory (RAM) or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 and further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, at least one ASIC or FPGA, firmware and/or program logic which in combination with the computer system causes or programs computer system 500 to be a special-purpose machine. According to one embodiment, the techniques herein are performed by computer system 500 in response to processor 504 executing at least one sequence of instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise bus 502. Transmission media can also take the form of acoustic or light waves, such as those generated during radio-wave and infra-red data communications.

Various forms of media may be involved in carrying at least one sequence of instruction to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through at least one network to other data devices. For example, network link 520 may provide a connection through local network 522 to a host computer 524 or to data equipment operated by an Internet Service Provider (ISP) 526. ISP 526, in turn, provides data communication services through the world-wide packet data communication network commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520, and communication interface 518. In the Internet example, a server 530 might transmit a requested code for an application program through Internet 528, ISP 526, local network 522, and communication interface 518. The received code may be executed by processor 504 as it is received, and/or stored in storage device 510, or other non-volatile storage for later execution.

ADDITIONAL EXAMPLES

Illustrative examples of the technologies disclosed herein are provided below. An embodiment of the technologies may include any of the examples or a combination of any of the examples described below.

In an example 1, a mobile computing device includes a touchscreen; a processor coupled to the touchscreen; memory coupled to the processor and storing one or more sequences of instructions which, when executed by the processor, cause the processor to perform: displaying, on the touchscreen, a graphical user interface that includes a virtual keyboard, an input area, and an output area; receiving, from the touchscreen, first signal data indicative of a location in the input area of a target word within a text sequence; in response to the first signal data, displaying, in the output area, a subset of candidate synonyms for the target word, the subset of candidate synonyms being created by inputting the text sequence including the target word into a dependency parser computer program stored on the mobile computing device and receiving, from the dependency parser computer program, output comprising syntactic dependency data for the target word; inputting the syntactic dependency data into a neural network-based model that has been trained to cause the neural network-based model to output a dependency context vector indicating a semantic meaning of the syntactic dependency data; for each candidate synonym of a set of candidate synonyms, using a target word vector indicating a semantic meaning of the target word, a candidate word vector indicating a semantic meaning of the candidate synonym, and the dependency context vector, computing a similarity score indicating a semantic similarity of the candidate synonym to the target word; when the similarity score for a candidate synonym satisfies a criterion, adding the candidate synonym to the subset of candidate synonyms; receiving, from the touchscreen, second signal data indicating a location, in the output area, of a synonym selected from the subset of candidate synonyms; using the first signal data, replacing the target word in the input area with the selected synonym.

In an example 2, a computer-implemented method includes: determining and storing in memory of a mobile computing device, digital data including a target word of a text sequence, a set of candidate synonyms for the target word, a target word vector indicating a semantic meaning of the target word, and, for each candidate synonym of the set of candidate synonyms, a candidate word vector indicating a semantic meaning of the candidate synonym; inputting the text sequence including the target word into a dependency parser computer program stored on the mobile computing device and receiving, from the dependency parser computer program, output comprising syntactic dependency data for the target word; inputting the syntactic dependency data into a neural network-based model that has been trained to cause the neural network-based model to output a dependency context vector indicating a semantic meaning of the syntactic dependency data; for each candidate synonym of the set of candidate synonyms, using the target word vector, the candidate word vector, and the dependency context vector, computing a similarity score indicating a semantic similarity of the candidate synonym to the target word; when the similarity score for a candidate synonym satisfies a criterion, adding the candidate synonym to a subset of the set of candidate synonyms; in response to determining the target word and determining the subset of the set of candidate synonyms satisfies a confidence level value, causing a virtual keyboard software application of the mobile computing device to switch to a synonym mode and programmatically providing the subset of the set of candidate synonyms to the virtual keyboard software application for use by the synonym mode.

An example 3 includes the subject matter of example 2 or example 1, further including using cursor position data to determine the target word, the cursor position data obtained from an input area of a graphical user interface of the virtual keyboard software application, the graphical user interface rendered on a display screen of the mobile computing device, the virtual keyboard software application stored in memory of the mobile computing device. An example 4 includes the subject matter of any of examples 1-3, the cursor position data indicating a time interval during which a position of a cursor in the input area remained unchanged. An example 5 includes the subject matter of any of examples 1-4, the cursor position data indicating a user selection detected by a touchscreen of the mobile computing device. An example 6 includes the subject matter of any of examples 1-5, further comprising causing the mobile computing device to display the subset of the set of candidate synonyms in an output area adjacent the input area of the graphical user interface. An example 7 includes the subject matter of any of examples 1-6, further comprising determining the target word vector by inputting the target word into a second neural network-based model trained to determine a semantic representation of a word, and determining output produced by the second neural network-based model in response to the inputting of the target word into the second neural network-based model. An example 8 includes the subject matter of any of examples 1-7, further comprising determining the candidate word vector by inputting the candidate synonym into a second neural network-based model and determining output produced by the second neural network-based model in response to the inputting of the candidate word vector into the second neural network-based model. An example 9 includes the subject matter of any of examples 1-8, the syntactic dependency data including data indicating a syntactic dependency relationship between the target word and at least one other word of the text sequence. An example 10 includes the subject matter of any of examples 1-9, the text sequence including at least three tokens between the target word and the at least one other word of the text sequence. An example 11 includes the subject matter of any of examples 1-10, further comprising, for each candidate synonym of the set of candidate synonyms, computing the similarity score by computing a dot product of the target word vector and the candidate word vector, computing a dot product of the dependency context vector and the candidate word vector, and adding the dot product of the target word vector and the candidate word vector to the dot product of the dependency context vector and the candidate word vector. An example 12 includes the subject matter of any of examples 1-11, further comprising determining that the similarity score satisfies a criterion by sorting similarity scores in descending order and adding a candidate synonym that has a top k-ranked similarity score to the subset of the set of candidate synonyms, where k is a positive integer less than or equal to 5. An example 13 includes the subject matter of any of examples 1-12, further comprising computing a hash of the dependency context vector and storing the hash of the dependency context vector in memory of the mobile computing device.

In an example 14, a method includes displaying, on a touchscreen of a mobile computing device, a graphical user interface comprising a virtual keyboard, an input area, and an output area; receiving, from the touchscreen, first signal data indicating a location in the input area of a target word; in response to the first signal data, displaying, in the output area, a subset of candidate synonyms for the target word; the subset of candidate synonyms being created by determining syntactic dependency data for the target word, inputting the syntactic dependency data into a neural network-based model trained to cause the neural network-based model to output a dependency context vector indicating a semantic meaning of the syntactic dependency data, and using the dependency context vector to computing a similarity score indicating a semantic similarity between a candidate synonym and the target word; receiving, from the touchscreen, second signal data indicating a location, in the output area, of a selected synonym; using the first signal data, replacing the target word in the input area with the selected synonym.

An example 15 includes the subject matter of example 14, the first signal data indicating a time interval during which a position of a cursor in the input area remained unchanged. An example 16 includes the subject matter of example 14 or example 15, the first signal data indicating a user selection detected by a touchscreen of the mobile computing device.

In an example 17, a mobile computing device includes a touchscreen; a processor coupled to the touchscreen; memory coupled to the processor and storing one or more sequences of instructions which, when executed by the processor, cause the processor to perform: displaying, on the touchscreen, a graphical user interface that includes a virtual keyboard, an input area, and an output area; receiving, from the touchscreen, first signal data indicating a location in the input area of a target word within a text sequence; in response to the first signal data, displaying, in the output area, a subset of candidate synonyms for the target word; the subset of candidate synonyms being created by determining syntactic dependency data for the target word, inputting the syntactic dependency data into a neural network-based model trained to cause the neural network-based model to output a dependency context vector indicating a semantic meaning of the syntactic dependency data, and using the dependency context vector to computing a similarity score indicating a semantic similarity between a candidate synonym and the target word; the syntactic dependency data produced, by a dependency parser computer program stored in the memory, in response to providing the text sequence including the target word as input to the dependency parser computer program; receiving, from the touchscreen, second signal data indicating a location, in the output area, of a synonym selected from the subset of candidate synonyms; using the first signal data, replacing the target word in the input area with the selected synonym.

An example 18 includes the subject matter of example 17, the virtual keyboard having at least two modes including a synonym mode, the memory coupled to the processor and storing instructions, that when executed by the processor, further cause, in response to the first signal data, the virtual keyboard to switch from another mode to the synonym mode. An example 19 includes the subject matter of example 17 or example 18, the memory coupled to the processor and storing instructions, that when executed by the processor, further cause computing a hash of the dependency context vector and storing the hash of the dependency context vector in memory of the mobile computing device. An example 20 includes the subject matter of any of examples 17-19, the syntactic dependency data including data indicating a syntactic dependency relationship between the target word and at least one other word of the text sequence.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A computer-implemented method comprising:
in response to receiving a text sequence input of two or more words, determining and storing, in memory of a mobile computing device, the text sequence and a target word of the text sequence;
inputting the text sequence including the target word into a dependency parser computer program stored on the mobile computing device and receiving, from the dependency parser computer program, output comprising syntactic dependency data for the target word including data indicating a syntactic dependency relationship between the target word and at least one other word of the text sequence;
retrieving a target word vector indicating a semantic meaning of the target word, a set of candidate synonyms for the target word and a candidate word vector for each candidate synonym, the candidate word vector indicating a semantic meaning of the candidate synonym;
inputting the syntactic dependency data into a neural network-based model that has been trained to cause the neural network-based model to output a dependency context vector indicating a semantic meaning of the syntactic dependency data;
for each candidate synonym of the set of candidate synonyms using the target word vector, the candidate word vector, and the dependency context vector, computing a similarity score and a rank order, wherein the similarity score indicates a semantic similarity of the candidate synonym to the target word, and the rank order is determined by the similarity score for each candidate synonym of the set of candidate synonyms;
when the similarity score for a candidate synonym satisfies a criterion, adding the candidate synonym to the subset of candidate synonyms;
ranking the subset of candidate synonyms by the rank order for each candidate synonym of the subset of candidate synonyms;
displaying the subset of candidate synonyms on a graphical user interface.

2. The computer-implemented method of claim 1, wherein receiving a text sequence input comprises a voice interface receiving audio signals containing speech and converting the audio signals to words.

3. The computer-implemented method of claim 2, wherein receiving a text sequence input comprises transcribing words spoken in the vicinity of a microphone.

4. The computer-implemented method of claim 1, wherein receiving a text sequence input comprises extracting text from a digital content item.

5. The computer-implemented method of claim 4, wherein extracting the text from a digital content item comprises extracting the text from a software application.

6. The computer-implemented method of claim 5, wherein the software application comprises one of an email program, an instant messaging program or a social media program.

7. The computer-implemented method of claim 4, wherein extracting the text from a digital content item comprises extracting the text from a document, a message, a social media posting, a list of search results, or a web page.

8. The computer-implemented method of claim 1, wherein receiving a text sequence input including a target word comprises detecting a trigger signal and switching from displaying a virtual keyboard to displaying a thesaurus interface.

9. The computer-implemented method of claim 8, wherein the trigger signal comprises one or more of a position of a cursor relative to a word in the text sequence input and a time elapsed from a last cursor movement.

10. The computer-implemented method of claim 1, wherein the rank order is a descending order for the subset of candidate synonyms.

11. A mobile computing device, comprising a touchscreen, a processor coupled to the touchscreen, a memory coupled to the processor, and one or more non-transitory computer-readable media coupled to the processor and storing one or more sequences of instructions which, when executed by the processor, cause the processor to perform:
displaying, on the touchscreen, a graphical user interface that includes an input area and an output area;
receiving a text sequence input including a target word;
displaying, in the output area, a subset of candidate synonyms for the target word, the subset of candidate synonyms being created by
inputting the text sequence including the target word into a dependency parser computer program stored on the mobile computing device and receiving, from the dependency parser computer program, output comprising syntactic dependency data for the target word including data indicating a syntactic dependency relationship between the target word and at least one other word of the text sequence;
inputting the syntactic dependency data into a neural network-based model that has been trained to cause the neural network-based model to output a dependency context vector indicating a semantic meaning of the syntactic dependency data;
retrieving a set of candidate synonyms for the target word from a search engine;
for each candidate synonym of the set of candidate synonyms, using a target word vector indicating a semantic meaning of the target word, a candidate word vector indicating a semantic meaning of the candidate synonym, and the dependency context vector, computing a similarity score and a rank order, wherein the similarity score indicates a semantic similarity of the candidate synonym to the target word, and the rank order is determined by the similarity score for each candidate synonym of the set of candidate synonyms;
when the similarity score for a candidate synonym satisfies a criterion, adding the candidate synonym to the subset of candidate synonyms;
ranking the subset of candidate synonyms by the rank order for each candidate synonym of the subset of candidate synonyms.

12. The mobile computing device of claim 11, wherein the instructions for receiving a text sequence input further comprise sequences of instructions which, when executed by the processor, cause the processor to perform: a voice interface receiving audio signals containing speech and converting the audio signals to words.

13. The mobile computing device of claim 12, wherein the instructions for receiving a text sequence input comprise sequences of instructions which, when executed by the processor, cause the processor to perform transcribing words spoken in the vicinity of a microphone.

14. The mobile computing device of claim 11, wherein the instructions for receiving a text sequence input comprise sequences of instructions which, when executed by the processor, cause the processor to perform extracting text from a digital content item.

15. The mobile computing device of claim 14, wherein the instructions for extracting the text from a digital content item comprise sequences of instructions which, when executed by the processor, cause the processor to perform extracting the text from a software application.

16. The mobile computing device of claim 15, wherein the software application comprises one of an email program, an instant messaging program or a social media program.

17. The mobile computing device of claim 14, wherein the instructions for extracting the text from a digital content item comprise sequences of instructions which, when executed by the processor, cause the processor to perform extracting the text from a document, a message, a social media posting, a list of search results, or a web page.

18. The mobile computing device of claim 11, wherein the instructions for receiving a text sequence input including a target word comprise sequences of instructions which, when executed by the processor, cause the processor to perform detecting a trigger signal and switching from displaying a virtual keyboard to displaying a thesaurus interface.

19. The mobile computing device of claim 18, wherein the trigger signal comprises one or more of a position of a cursor relative to a word in the text sequence input and a time elapsed from a last cursor movement.

20. The mobile computing device of claim 11, wherein the rank order is a descending order for the subset of candidate synonyms.

\* \* \* \* \*